United States Patent [19]

Small

[11] Patent Number: 5,835,117
[45] Date of Patent: Nov. 10, 1998

[54] NONLINEAR DITHERING TO REDUCE NEUTRAL TOE COLOR SHIFTS

[75] Inventor: Jeffrey A. Small, Rochester, N.Y.

[73] Assignee: Eastman Kodak Company, Rochester, N.Y.

[21] Appl. No.: 657,880

[22] Filed: May 31, 1996

[51] Int. Cl.$^6$ ................................ B41J 2/315; B41J 2/52
[52] U.S. Cl. ..................... 347/183; 347/188; 358/455; 358/456; 358/465; 358/466
[58] Field of Search .................... 347/188, 183, 347/211; 400/120.07; 358/455, 456, 465, 466

[56] References Cited

U.S. PATENT DOCUMENTS

| | | | |
|---|---|---|---|
| 5,243,443 | 9/1993 | Eschbach | 358/455 |
| 5,291,311 | 3/1994 | Miller | 358/456 |
| 5,321,525 | 6/1994 | Hains | 358/456 |
| 5,377,041 | 12/1994 | Spaulding et al. | 358/518 |
| 5,444,551 | 8/1995 | Miller et al. | 358/456 |
| 5,585,833 | 12/1996 | Matumoto | 347/183 |

OTHER PUBLICATIONS

Robert W. Floyd and Louis Steinberg, "An Adaptive Algorithm For Spatial Greyscale," Proceeding of the S.I.D. vol. 17/2 Second Quarter 1976, pp. 75–77.

Robert Ulichney, "Digital Halftoning," The MIT Press, pp. 239–243.

Primary Examiner—Huan H. Tran
Attorney, Agent, or Firm—William F. Noval

[57] ABSTRACT

A method and apparatus are described for employing non-uniform quantization to avoid marking dots within a region where there is inadequate control of marking density or color. The techniques are typically applied to dye transfer media used in thermal printers where the dye transfer media has a potential variance among lots. Dithering modifications are described for use with non-uniform quantization to provide control of color marking in areas where the energy input into a dye transfer medium results in an output that can vary between different lots of the transfer medium. Error diffusion may also be used with such non-uniform quantization.

11 Claims, 3 Drawing Sheets

NONLINEAR DITHERING TO REDUCE NEUTRAL TOE COLOR SHIFTS

FIELD OF THE INVENTION

The invention relates generally to the field of dithering and in particular to non-linear dithering within thermal dye transfer printers to reduce neutral toe color shifts.

BACKGROUND OF THE INVENTION

In thermal dye-diffusion printers, it is difficult to control the white point of low-density neutral colors because the threshold for the onset of dye transfer varies for each of the process colors. FIG. 1 illustrates the variance in the output density for three different dyes as a function of the energy level placed into the dye. Prior art methods have compensated for these variances by employing separate look up tables for each of the process colors. Problems exist with this approach in that aging effects and minor variations in the manufacturing process for donors can cause these thresholds to move by varying amounts in different lots of donor supplies for the same color donor. FIG. 2 shows a typical illustration of these effects. Such variations make adequate compensation difficult, and can cause drastic color shifts with respect to small changes in density in regions with densities near these threshold values. Minor variations can also occur in the surface of the receiver that cause spatial variations in the onset of the dye transfer, which can result in mottle in the resulting prints. Employing appropriate measures in the design of the donor and the receiver, as well as pre-aging these materials can partially mitigate these effects. However, noticeable color shifts still occur in the low density areas of resulting prints. These color shifts are very noticeable to the human eye, and are very undesirable.

From the foregoing discussion it can be seen that there remains a need within the art for a method and apparatus that can prevent color shifts that are noticeable to the human eye in low density areas.

SUMMARY OF THE INVENTION

The present invention overcomes one or more of the problems set forth above. Minimization in the appearance of color shifts resulting from variance in the threshold for the onset of dye transfer is achieved by not printing pixels whose densities are in the range most affected by these color shifts. This technique applies a non-uniform quantizer to replace this limited range of pixels. In order to print regions that do have densities in this undesired range, either dithering or error diffusion may be used in combination with a non-uniform quantizer. The quantizer output values would avoid the low-density range where undesired color shifts are most likely to occur.

Briefly summarized, according to one aspect of the present invention, a method of reproducing images is taught comprising the steps of: acquiring a digital version of an image to be reproduced, the digital image having a plurality of elements; further providing a density value for each of elements within the image; selecting a range of the density values that are processed differently from remaining density values; and applying non-uniform quantization to the range of density values.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention provides advantages in disclosing a method that can be employed upon a dye transfer apparatus to achieve even density steps in regions within the donor transfer curves that typically would not have even density steps. Inconsistencies in transfer regions within present and future donor supplies are alleviated. These advantages are provided by a methodology that can easily and economically be incorporated into a dye transfer device.

BRIEF DESCRIPTION OF THE DRAWINGS

FIG. 3b is a step diagram of the digital code values used to generate the energy levels of FIG. 3a.

To facilitate understanding, identical reference numerals, where possible, designate identical elements that are common to the figures.

DETAILED DESCRIPTION OF THE INVENTION

It has been discovered that minimization in the appearance of color shifts that result from variance in the threshold for the onset of dye transfer can be achieved by not printing pixels having densities in a predetermined target range. The range that is most likely to be affected by these color shifts is that region for specific donor colors in which there is variance between various donor lots resulting in non-uniform densities in color output. The technique involves replacing a limited range of pixels by non-uniform quantizing the print regions with densities in the undesired range. It is envisioned that either dithering or error diffusion be combined with a non-uniform quantizer to perform this technique.

Figure 1:
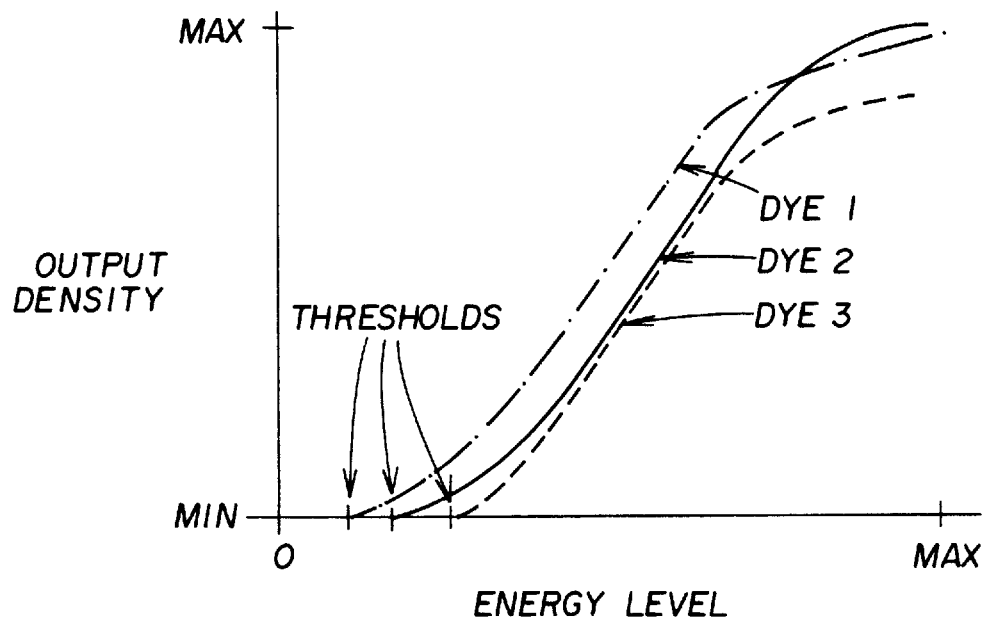
FIG. 1 is a diagram illustrating transfer curves for three different dyes.
Figure 2:
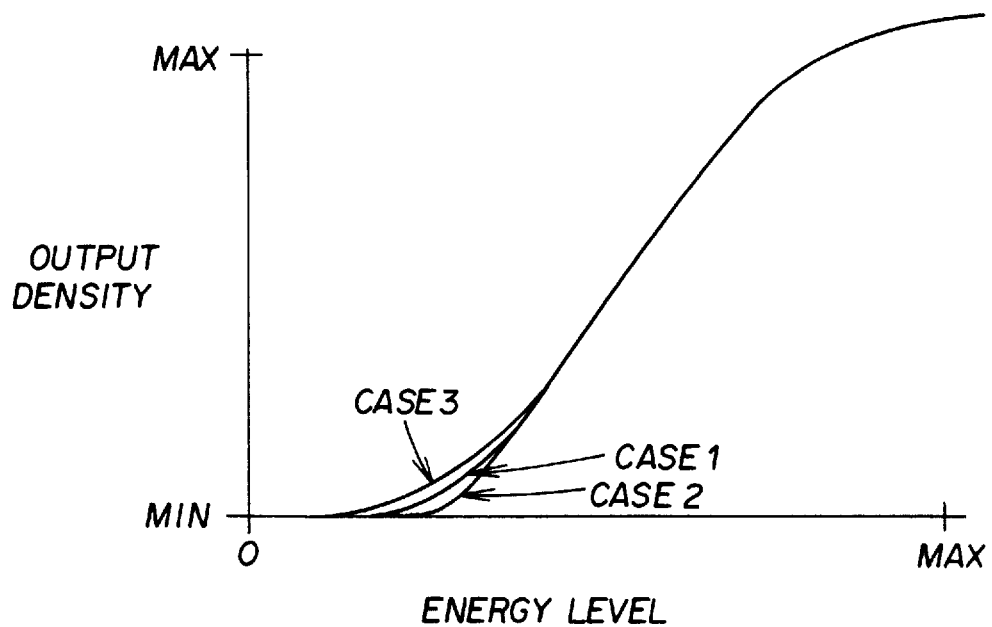
FIG. 2 is a diagram illustrating transfer curves for three different lots of a given dye.
Figure 3A:
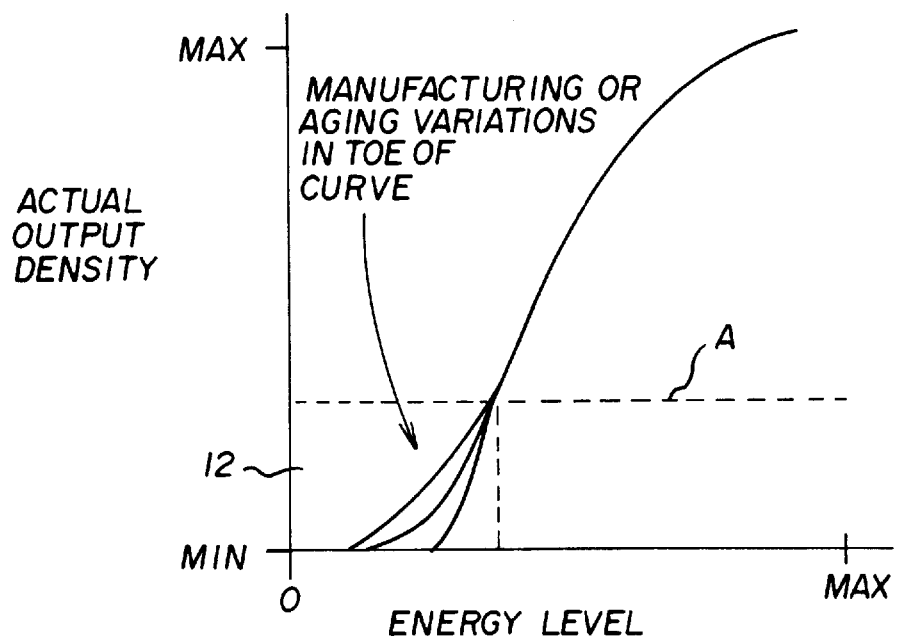
FIG. 3a is a illustration of the output density of a dye versus the energy level input.

FIG. 3a is an illustration of the output density for different rolls of a single donor color versus the energy level that is input into the donor to achieve that output density. The present invention envisions modifying that range of the energy level that is the low-density region 12 as indicated by the area having a desired output density that is below dotted line A, to provide output densities that are consistent between rolls of the same donor color.

Figure 3B:
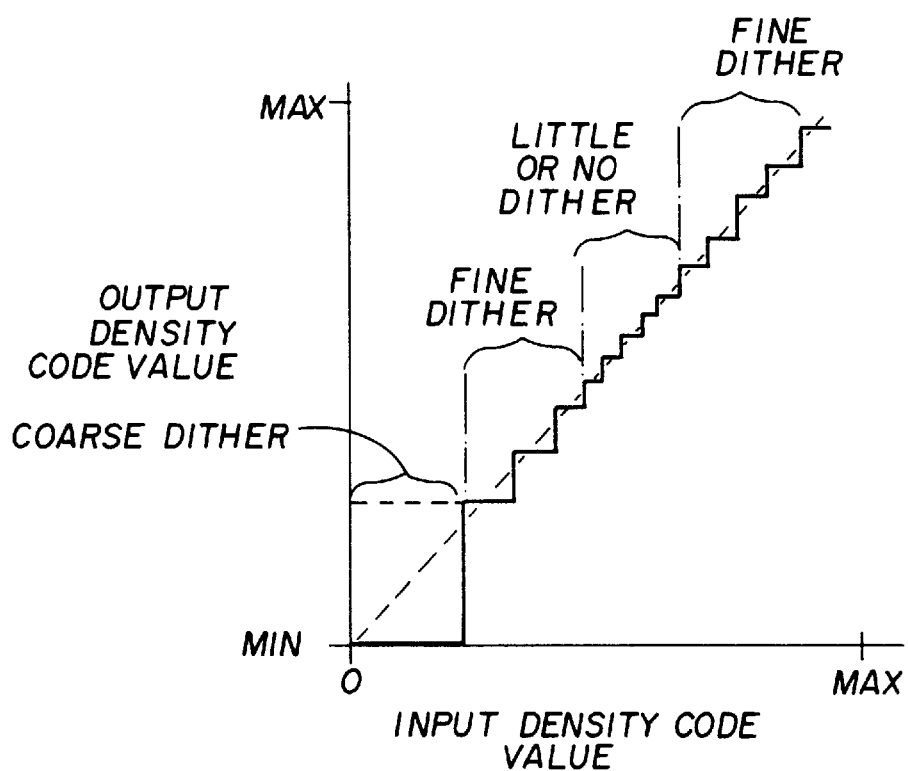

As illustrated in FIG. 3b the input density code value is quantized into an output density code value. The quantization is non-uniform. As illustrated in FIG. 3a, this output density code value corresponds to the energy level which will be placed into the donor, resulting in an actual output density. The quantizer output values avoid the low density range, as determined by region 12, where undesired color shifts are most likely to occur, as shown in FIG. 3a.

In order to avoid contouring artifacts, dithering must precede the steps of FIGS. 3a and 3b, or else error diffusion must be combined with the quantization of FIG. 3b such that the quantization error for a given pixel is diffused to adjacent pixels which have not yet been quantized. For the case of dithering, the degree of dithering must be adjusted so as to be greater for densities where the quantizer step sizes of FIG. 3b are greater. No adjustments are needed for the case of error diffusion.

Figure 4:
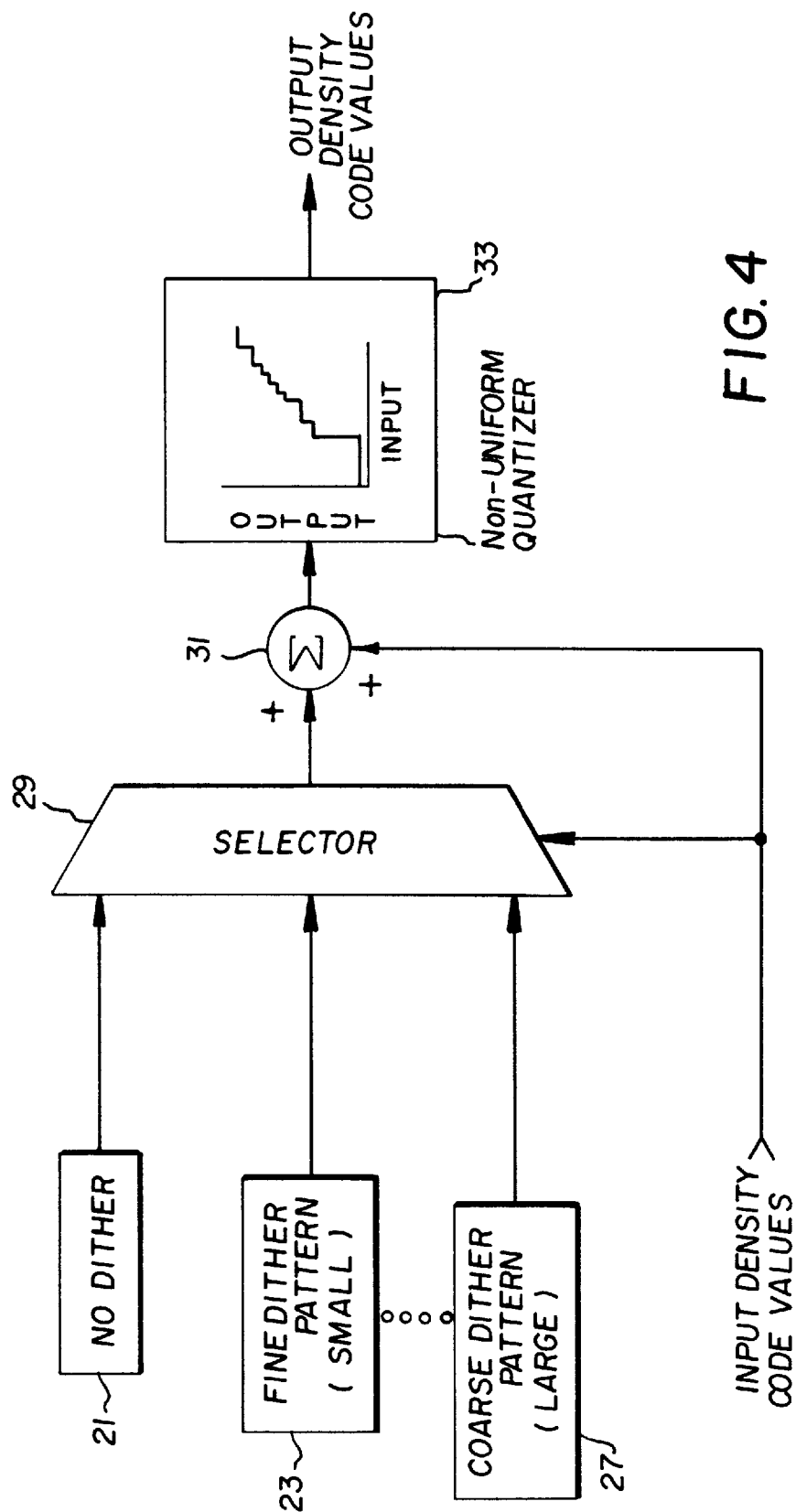
FIG. 4 is a block diagram of the present invention.

FIG. 4 is a block diagram of a typical system envisioned by the present invention used to generate the output density code values from the image input density code values. Here, the digital image is converted into a series of digital codes. These digital codes are used by selector 29 to determine if a no dither 21, fine dither 23, or coarse dither 27 pattern will be combined with the digital input density code value. The selected pattern is combined with the digital code value by summation 31 and then quantized by non-uniform quantizer 33.

In the case of dithering, a selector selects one of several dither patterns as shown in FIG. 4, where a more aggressive dither pattern is selected for those pixels which would otherwise result in the printing of undesired densities. Finally, that dither pattern is added to the input pixel, and the quantizer is then used to determine the resulting output value. The selected dither pattern must have sufficient amplitude and spatial extent to avoid unwanted contouring artifacts for the particular quantizer step size. In general, this dither pattern becomes smaller in both amplitude and spatial extent as the quantizer step size becomes smaller. For higher density pixels, it may be possible to eliminate the dither pattern entirely. Thus, regions of low density will be composed of a mixture of minimum density pixels which are below the density levels where unwanted color shifts occur, and higher density pixels which are above the density levels where unwanted color shifts occur. Then, due to the low-pass filtering characteristic of the human visual system, such regions will appear to have the correct average density and will have the correct neutral color balance. A full tone scale may thus be printed with acceptable neutral balance over the entire tone range, because no individual pixel or dot will be printed with densities within the undesirable range. The visual annoyance of dithering in the low-density regions is less than the visual annoyance of color shifts in such regions.

A set of printable dot densities may be defined that has no densities in some undesired range. In general, these density levels would not be uniformly spaced. For each input pixel, a dither pattern would be selected or scaled as a function of the input pixel's density code value, so as to be larger for those input density code values where the allowable output density levels are further apart, and so as to be smaller for those input density code values where the allowable output density levels are closer together. This could be done in a piecewise linear fashion, or as a smooth function of input density code value.

Rather than using dithering, error diffusion, as taught by Floyd and Steinberg, may be used with a non-uniform quantizer in order to avoid the undesirable output densities. The error diffusion method would not need to be modified, and the quantizer would be designed so that its output values did not fall within the range of undesirable densities.

The invention has been described with reference to a preferred embodiment. However, it will be appreciated that variations and modifications can be effected by a person of ordinary skill in the art without departing from the scope of the invention.

PARTS LIST 12 low density region
21 no dither pattern
23 fine dither pattern
27 coarse dither pattern
29 selector
31 summation
33 non-uniform quantizer

I claim:

1. A method of compensating for variations in dyes in reproducing images comprising the steps of:

providing a thermal dye-diffusion system;

acquiring a digital version of an image to be reproduced, the digital image comprising a plurality of elements;

providing a digital density value for each of elements;

determining at least one range of densities within at least one dye used on the thermal dye-diffusion system where compensation shall take place;

comparing the digital density of each element with the range of densities;

applying a predetermined pattern to elements found to be within the range; and combining the pattern with the density value for each element determined to be in the range;

applying non-uniform quantization to at least one range of density values.

2. The method of claim 1 wherein the step of applying further comprises applying error diffusion to provide an illusion of continuous tone.

3. The method of claim 1 wherein the step of applying further comprises applying dithering to provide an illusion of continuous tone.

4. The method of claim 1 wherein the step of applying further comprises applying different dither patterns that are selected to apply more dithering for pixels whose density values will be more coarsely quantized by the non-uniform quantization, and less dithering for pixels whose density values will be more finely quantized by the non-uniform quantizer.

5. A system for preventing color shifts in the reproduction of images comprising:

an input device capable of acquiring a digital version of an image, the digital image comprising a plurality of elements;

processing means operatively connected to the input device for determining a density value for each of elements;

a selector mechanism capable of identifying a predetermined range of the density values;

a non-uniform quantizer logically connected to the selector; and a switch mechanism operatively connected to the processing means, the selector and the non-uniform quantizer such that of density values within the range are operated on separately from those outside the range.

6. The system of claim 5 further wherein the non-uniform quantizer works in combination with the selector to avoid marking dots whose densities fall within the range where the range is selected based upon a predetermined estimation of marking process not providing adequate donor control for dot density.

7. The system of claim 5 further comprising means for applying error diffusion to provide an illusion of continuous tone.

8. The system of claim 5 further comprising means for applying dithering to provide an illusion of continuous tone.

9. The system of claim 8 wherein different dither patterns are selected to apply more dithering for pixels whose density values will be more coarsely quantized by the non-uniform quantizer, and less dithering for pixels whose density values will be more finely quantized by the non-uniform quantizer.

10. The system of claim 8 wherein a dither pattern is scaled to apply more dithering for pixels whose density values will be more coarsely quantized by the non-uniform quantizer, and less dithering for pixels whose density values will be more finely quantized by the non-uniform quantizer.

11. The system of claim 8 wherein no dithering is supplied to pixels whose density values will be sufficiently finely quantized by the non-uniform quantizer.

* * * * *